(12) United States Patent  
Carroll

(10) Patent No.: US 9,000,000 B2
(45) Date of Patent: Apr. 7, 2015

(54) WINDSHIELD WASHER CONDITIONER

(71) Applicant: WiperFill Holdings, LLC, Jupiter, FL (US)

(72) Inventor: Matthew Carroll, Jupiter, FL (US)

(73) Assignee: WiperFill Holdings, LLC, Jupiter, FL (US)

( * ) Notice: Subject to any disclaimer, the term of this patent is extended or adjusted under 35 U.S.C. 154(b) by 163 days.

(21) Appl. No.: 13/797,259

(22) Filed: Mar. 12, 2013

(65) Prior Publication Data

US 2013/0240419 A1  Sep. 19, 2013

Related U.S. Application Data

(60) Provisional application No. 61/610,275, filed on Mar. 13, 2012.

(51) Int. Cl.
  *B60S 1/48*   (2006.01)
  *B60S 1/50*   (2006.01)
  *C02F 1/42*   (2006.01)
  *C02F 103/00*   (2006.01)

(52) U.S. Cl.
  CPC .... *B60S 1/48* (2013.01); *B60S 1/50* (2013.01); *C02F 1/42* (2013.01); *C02F 2307/00* (2013.01); *C02F 2103/001* (2013.01); *C02F 2303/24* (2013.01)

(58) Field of Classification Search
  CPC ................ B60S 1/48; B60S 1/50; C02F 1/42; C02F 2001/425; C02F 2001/427
  USPC .......... 15/250.01; 134/109; 222/187; 210/95, 210/171, 172.1, 198.1, 202, 232, 251, 266, 210/282, 289, 502.1
  See application file for complete search history.

(56) References Cited

U.S. PATENT DOCUMENTS

| | | | |
|---|---|---|---|
| 2,701,897 A | | 2/1955 | Leming |
| 2,703,127 A | * | 3/1955 | Webb ............................. 383/41 |
| 2,770,017 A | | 11/1956 | Oishei et al. |
| 3,738,575 A | | 6/1973 | Somer |
| 5,261,254 A | | 11/1993 | Cattane |
| 5,347,661 A | * | 9/1994 | Fly et al. ....................... 4/225.1 |
| 5,669,986 A | | 9/1997 | Buchanan, Jr. et al. |
| 6,024,803 A | | 2/2000 | Buchanan, Jr. et al. |
| 6,089,620 A | * | 7/2000 | Mota Lopez et al. ......... 285/322 |
| 6,266,842 B1 | | 7/2001 | Muller |
| 2004/0112411 A1 | * | 6/2004 | Boykin et al. ................... 134/28 |

FOREIGN PATENT DOCUMENTS

| | | | |
|---|---|---|---|
| DE | 4101820 A1 | * 7/1992 | ............... B60S 1/46 |
| DE | 4436023 A1 | * 4/1995 | ............... B60S 1/48 |
| DE | EP1053922 | 11/2000 | |
| DE | 20022285 | 7/2001 | |
| DE | 10138466 | 4/2003 | |
| DE | 102005055714 | 3/2007 | |

* cited by examiner

*Primary Examiner* — Matthew O Savage
(74) *Attorney, Agent, or Firm* — McHale & Slavin, P.A.

(57) ABSTRACT

A system and method of collecting and conditioning rainwater and other moisture, such as dew, from a windshield of a vehicle and utilizing the collected fluid to replenish the fluids in the windshield washer reservoir. A collection funnel is positioned on a vehicle in order to collect rainwater and other moisture. Rainwater and other fluids from the collection funnel are directed to a conditioning cartridge where the water is de-ionized and windshield washer fluid is added. The cartridges are designed to be single replaceable units. The mixed fluid from the mixing cartridge is directed to the pre-existing windshield washer reservoir.

10 Claims, 8 Drawing Sheets

WINDSHIELD WASHER CONDITIONER

REFERENCE TO RELATED APPLICATIONS

In accordance with 37 C.F.R. §1.76, a claim of priority is included in an Application Data Sheet filed concurrently herewith. Accordingly, the present invention claims priority under 35 U.S.C. §§119(e), 120, 121, and/or 365(c) to U.S. Provisional Patent Application No. 61/610,275, entitled "Replenishing Windshield Washer", filed on Mar. 13, 2012. The contents of which the above referenced application is incorporated herein by reference in its entirety.

FIELD OF THE INVENTION

The present invention relates generally to an apparatus and method of replenishing and conditioning the fluid within a windshield washing system. In particular, to an apparatus which can recover rainwater, dew and recapture dispensed fluids from the windshield of a vehicle to replenish and condition the fluid within a windshield washing system.

BACKGROUND OF THE INVENTION

Windshield cleaning systems are old and well known in the art. Most of them employ a reservoir containing a fluid, such as water. The water can include an additive which will prevent the water from freezing in the colder climates. This additive is commonly known as a deicer. The deicer can also remove ice that has formed on the windshield of a vehicle. Other additives to the fluid reservoir include substances which enhance the cleaning properties of the water/fluid in the reservoir, such as all season windshield cleaner, all season windshield cleaner and deicer, rain repellant with or without all season cleaner or all season windshield cleaner and deicer.

In the winter months, when slush and other substances from the roads splash up onto the windshield of vehicles, the operator of the vehicle utilizes the windshield washer system repeatedly to clean the windshield to provide a clear view for driving. This high use of the windshield washer system can and normally does result in all of the fluid in the windshield washer reservoir being used up rapidly. If the vehicle operator is not vigilant in maintaining the washer reservoir full of fluid, the operator may be without the ability to clean the windshield when the need arises. Thus there is a need to provide a system and method of readily replenishing the fluid in a windshield washer reservoir without the vehicle operator constantly monitoring the fluid in the windshield washer reservoir.

DESCRIPTION OF THE PRIOR ART

U.S. Pat. No. 2,701,897 discloses a windshield cleaning system using water from the cooling system of an automobile. A metered amount of detergent is placed into the dispersed fluid.

U.S. Pat. No. 2,770,017 discloses a method of automatically replenishing the supply of liquefied solvent to the reservoir of a windshield washer. A trough or pipe line leads from the ventilating duct in the cowl as a means for recovering rainwater.

U.S. Pat. No. 3,738,575 discloses an automatic windshield washer for a vehicle of the type having a reservoir and spray nozzles. Means are provided to collect rain water and car wash water from the outer surface of the vehicle and means to feed the collected water to the reservoir. The valve means can trap sediment and add cleaning agents to the collected water.

U.S. Pat. No. 5,261,254 discloses a method and apparatus for self-replenishment of the solution contained within an automobile windshield washer system. Water is extracted from air such as through the use of a desiccant system in combination with an automobile air conditioning system. This water is combined with a stored concentrated anti-freeze liquid in a preselected ratio to produce a windshield washer solution having sufficient freezing point depression for use during winter weather conditions.

U.S. Pat. Nos. 5,669,986 and 6,024,803 disclose the use of rainwater on a vehicle to clean collection surfaces which have been contaminated with agents such as road salt and for storage in a reservoir for later use in windshield washing.

U.S. Pat. No. 6,266,842 discloses a windshield cleaning device for a windshield of a motor vehicle. A collecting device is provided for collecting and returning excess sprayed cleaning liquid, spray water, and rain water into the windshield fluid reservoir. A heat exchanger is provided for heating the cleaning liquid pumped by the pump by heat energy derived from the cooling water cooling the motor of the motor vehicle. A control circuit measures at least one temperature that can be the ambient temperature or the temperature of the cleaning liquid and allows pumping of the cleaning liquid onto the windshield only above a set temperature limit. A metering device automatically introduces an alcohol mixture, and optionally surface-active agents, into the cleaning liquid based on the measured temperature.

SUMMARY OF THE INVENTION

A system and method of collecting rainwater and other moisture, such as dew, from a windshield of a vehicle and conditioning the collected fluid to replenish the windshield washer reservoir. One or more collection funnels are located at various locations on a vehicle. Rainwater and other fluids from these funnels are directed to a fluid conditioning cartridge. The fluid conditioning cartridge includes quick connect fittings to allow the cartridge to be a single replaceable unit.

Accordingly, it is an objective of the present invention to provide a system that collects fluids and utilizes these fluids to replenish the fluids in a windshield washer reservoir of a vehicle.

It is a further objective of the present invention to collect rain or dew on windshields to condition and replenish the fluids in a windshield washer reservoir of a vehicle.

It is yet another objective of the present invention to collect rain or dew on various parts of a vehicle to replenish the fluids in a windshield washer reservoir of a vehicle.

It is a still further objective of the present invention to provide a disposable fluid conditioning cartridge to condition the fluids in a windshield washer reservoir of a vehicle.

It is still yet a further objective of the present invention to collect rain, dew, or melting snow/ice on windshield wipers and to collect rain, dew, or melting snow/ice on various portions of a vehicle to replenish the fluids in a windshield washer reservoir of a vehicle.

It is still yet a further objective of the present invention to provide a replaceable mixing cartridge between the collection point of rain, dew, or other fluids and a windshield washer reservoir. Fluid additives may be added to the collected fluids in the mixing cartridge and the resulting fluid delivered to a pre-existing windshield washer reservoir on a vehicle.

Other objectives and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

DETAILED DESCRIPTION OF THE INVENTION

Figure 1:
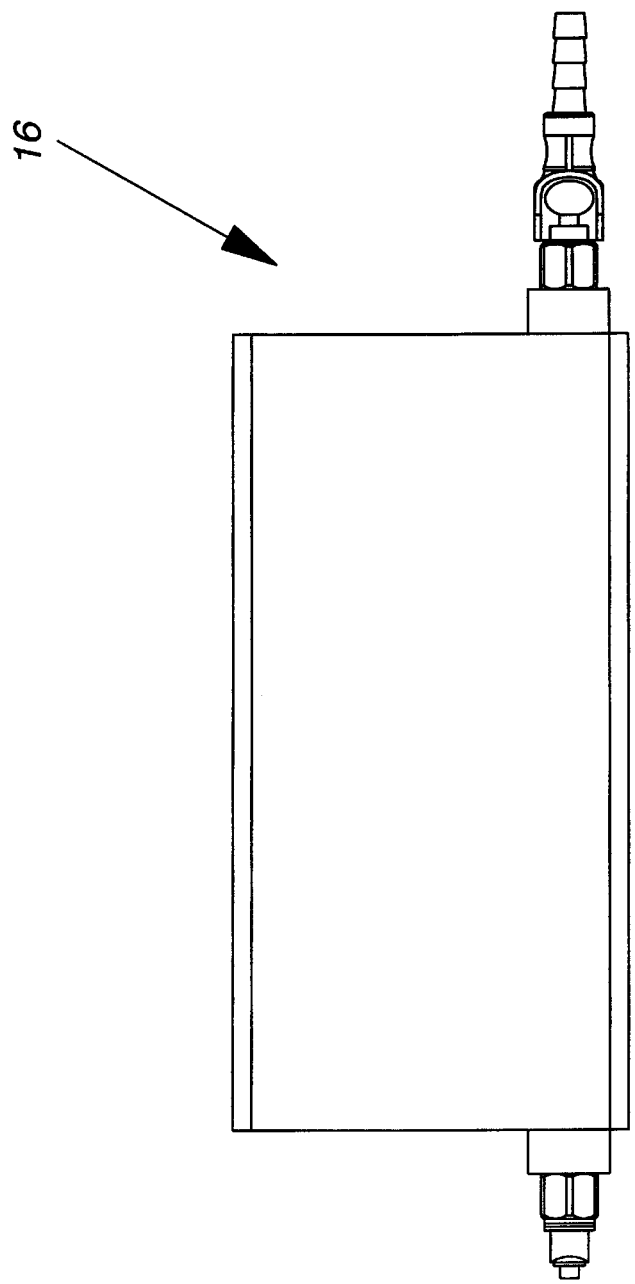
FIG. 1 is a side perspective view of the present invention.
Figure 2:
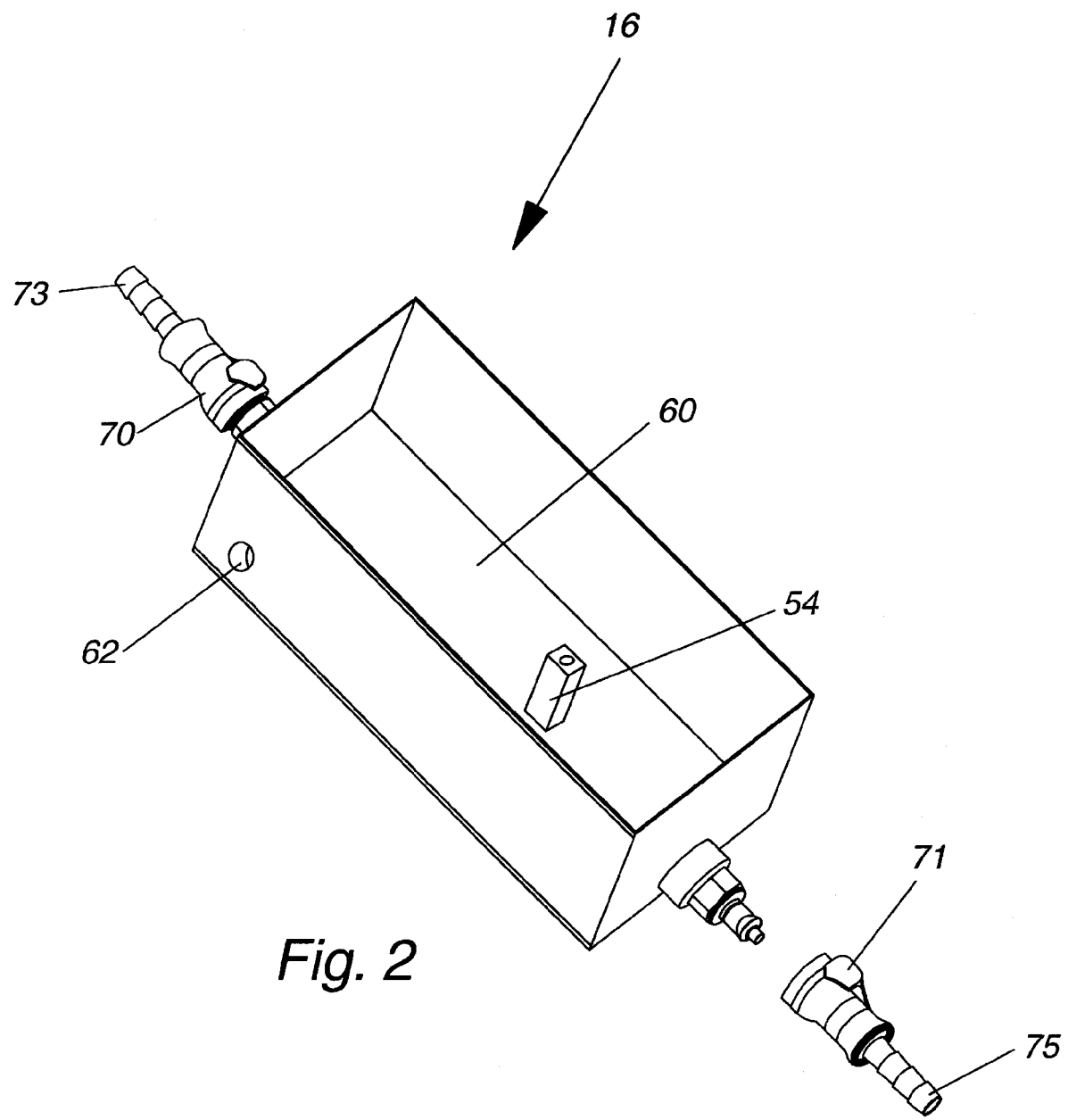
FIG. 2 is a partial top perspective view of the mixing cartridge.
Figure 3:
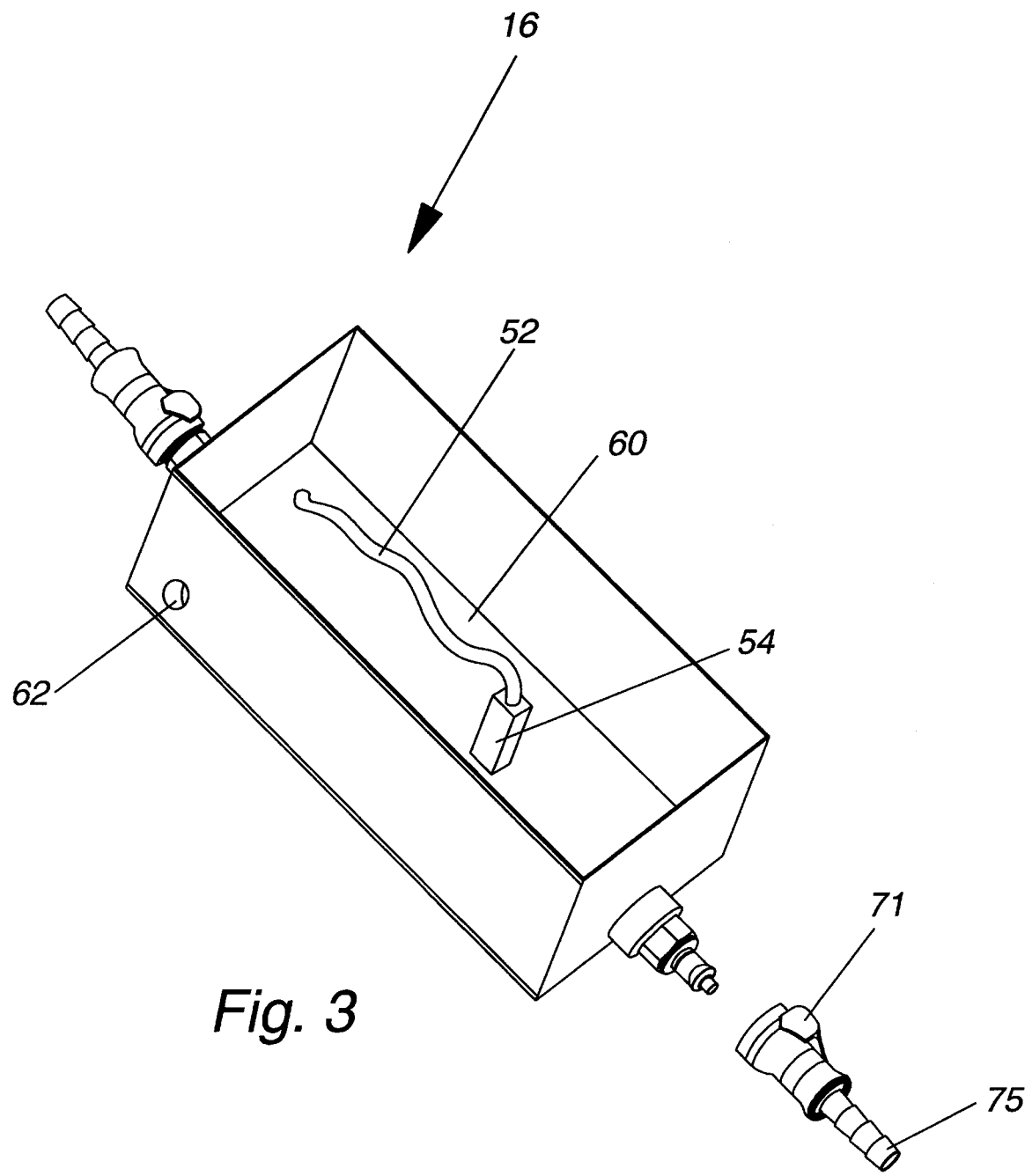
FIG. 3 is a partial top perspective view of the mixing cartridge illustrating the wick placement.
Figure 4:
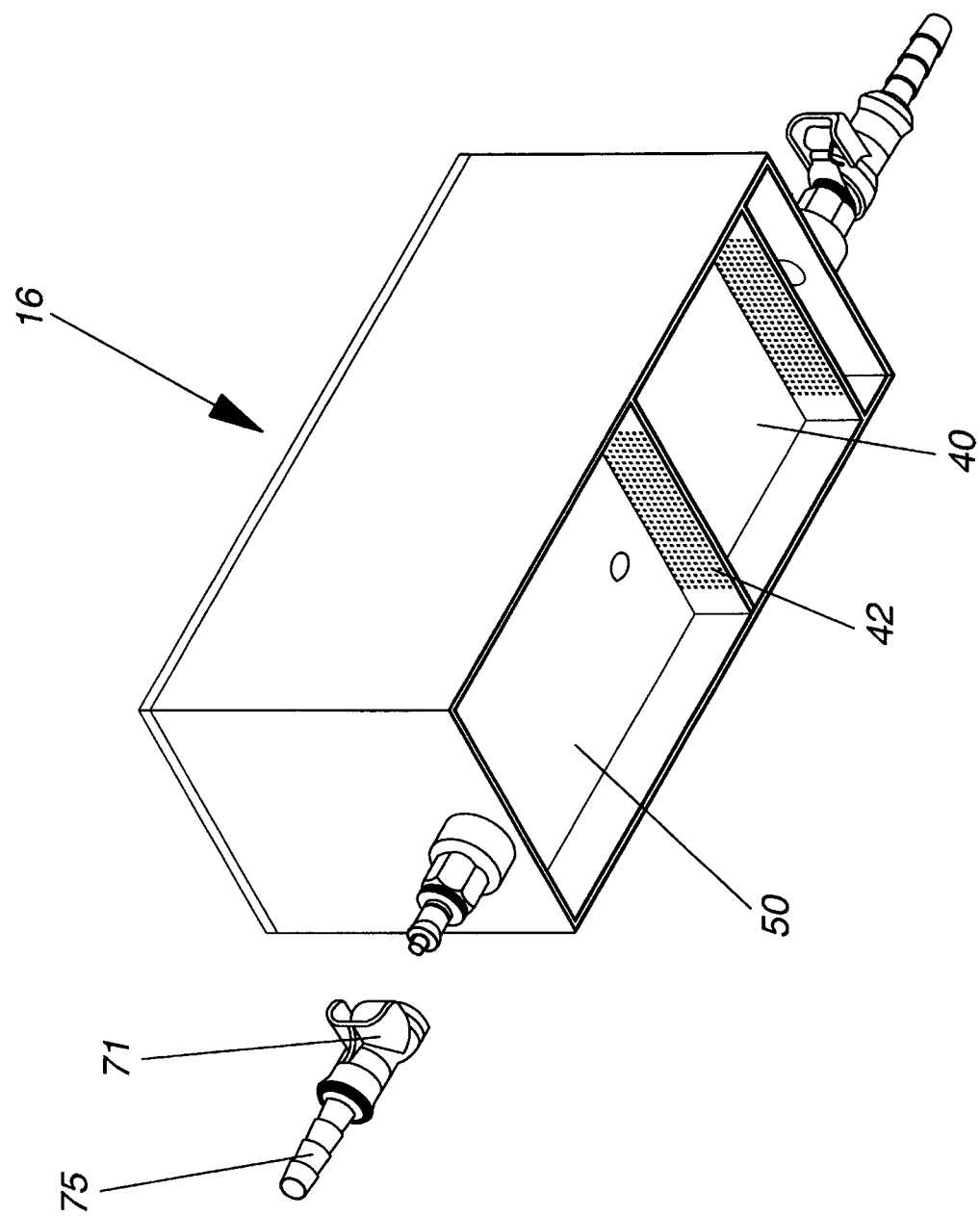
FIG. 4 is a partial bottom perspective view of the mixing cartridge.
Figure 5:
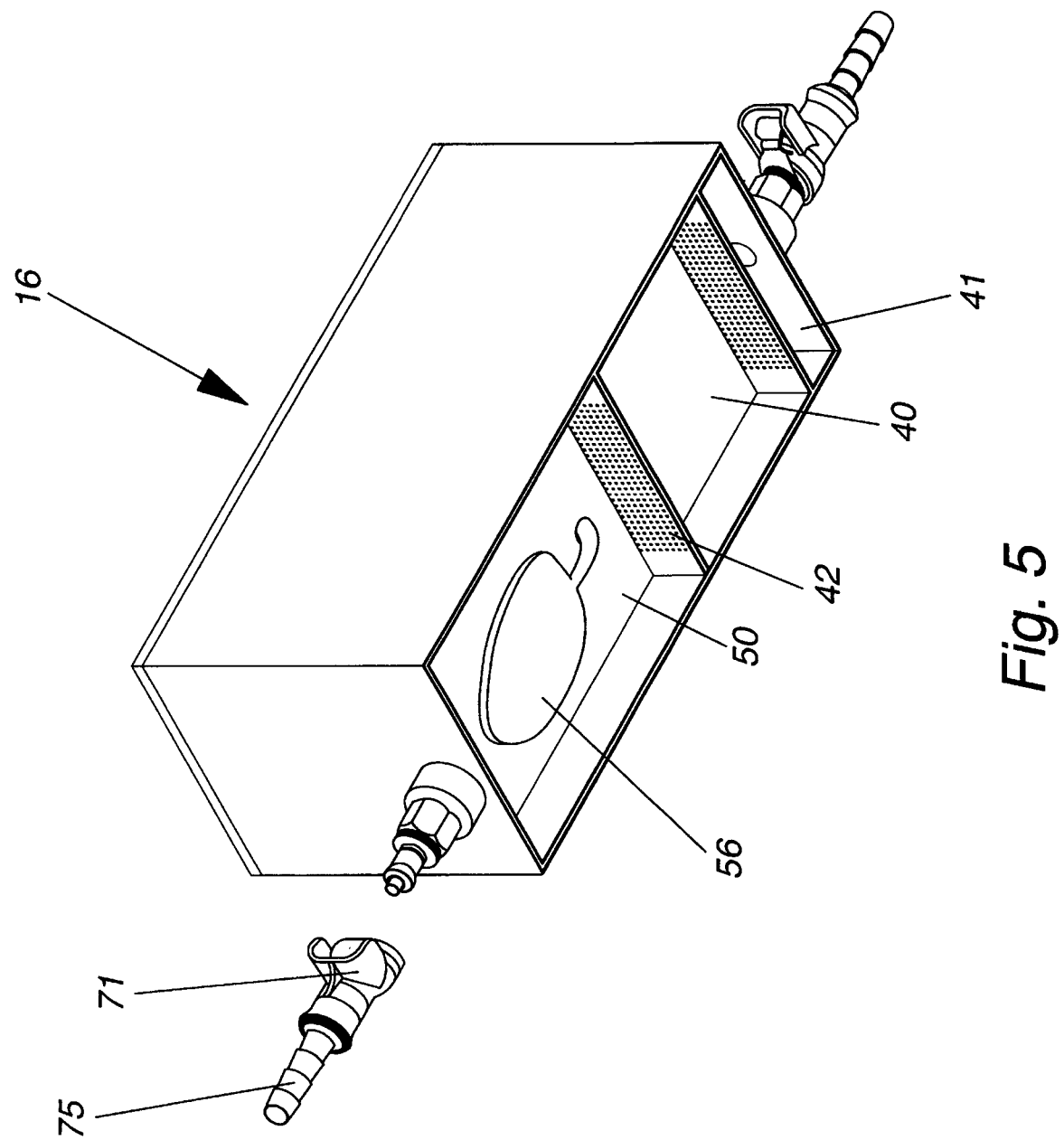
FIG. 5 is a partial bottom perspective view of the mixing cartridge.
Figure 6:
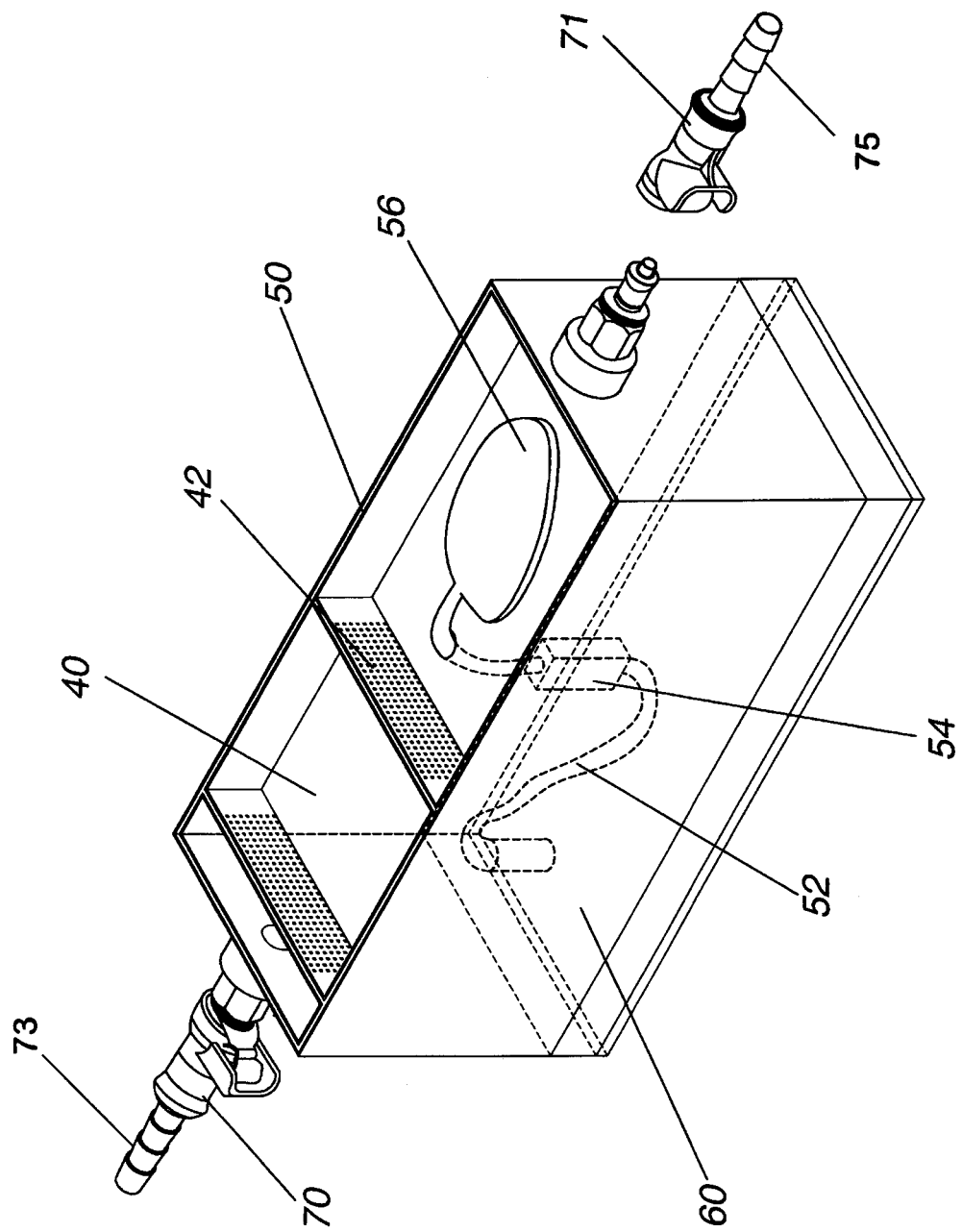
FIG. 6 is a perspective view of the mixing cartridge.
Figure 7:
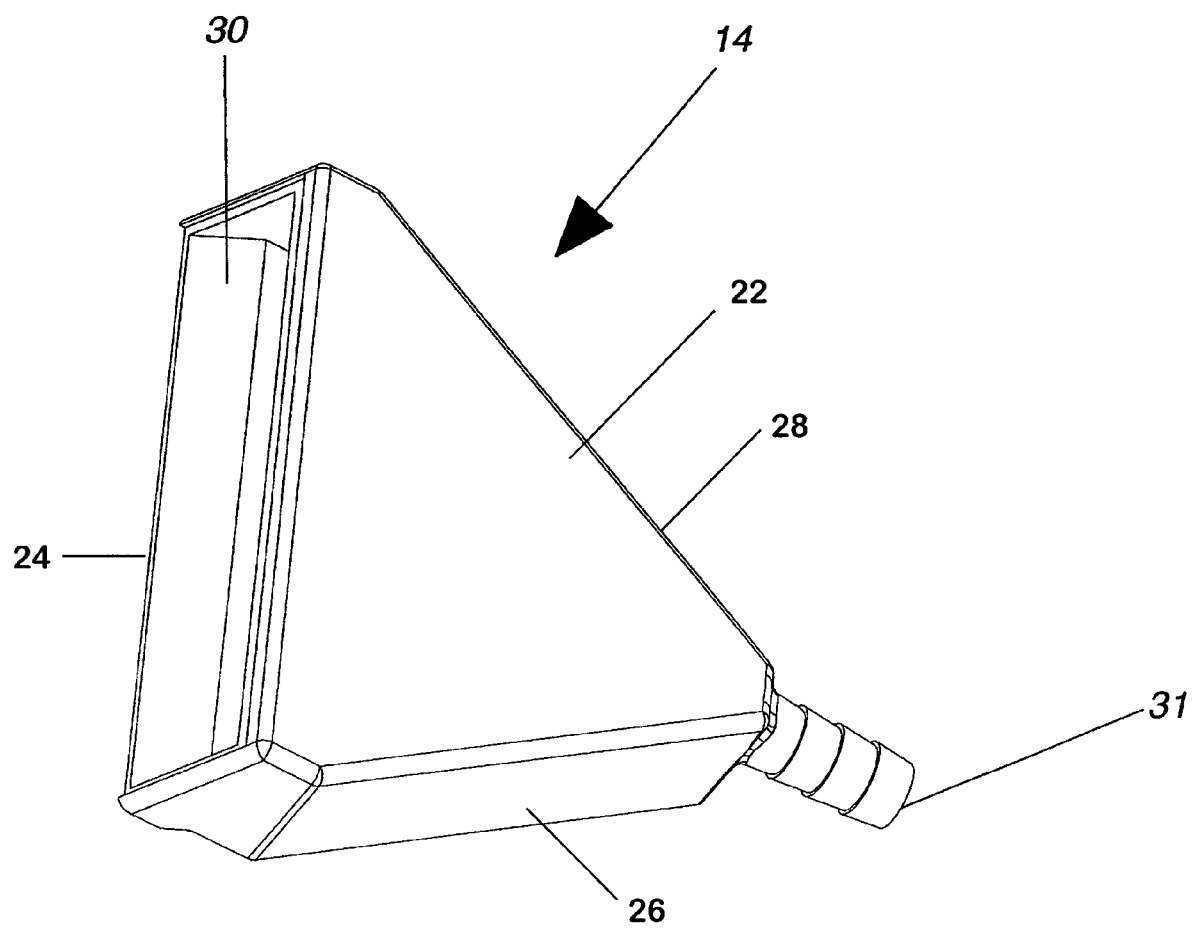
FIG. 7 is a top perspective view of the collection funnel.
Figure 8:
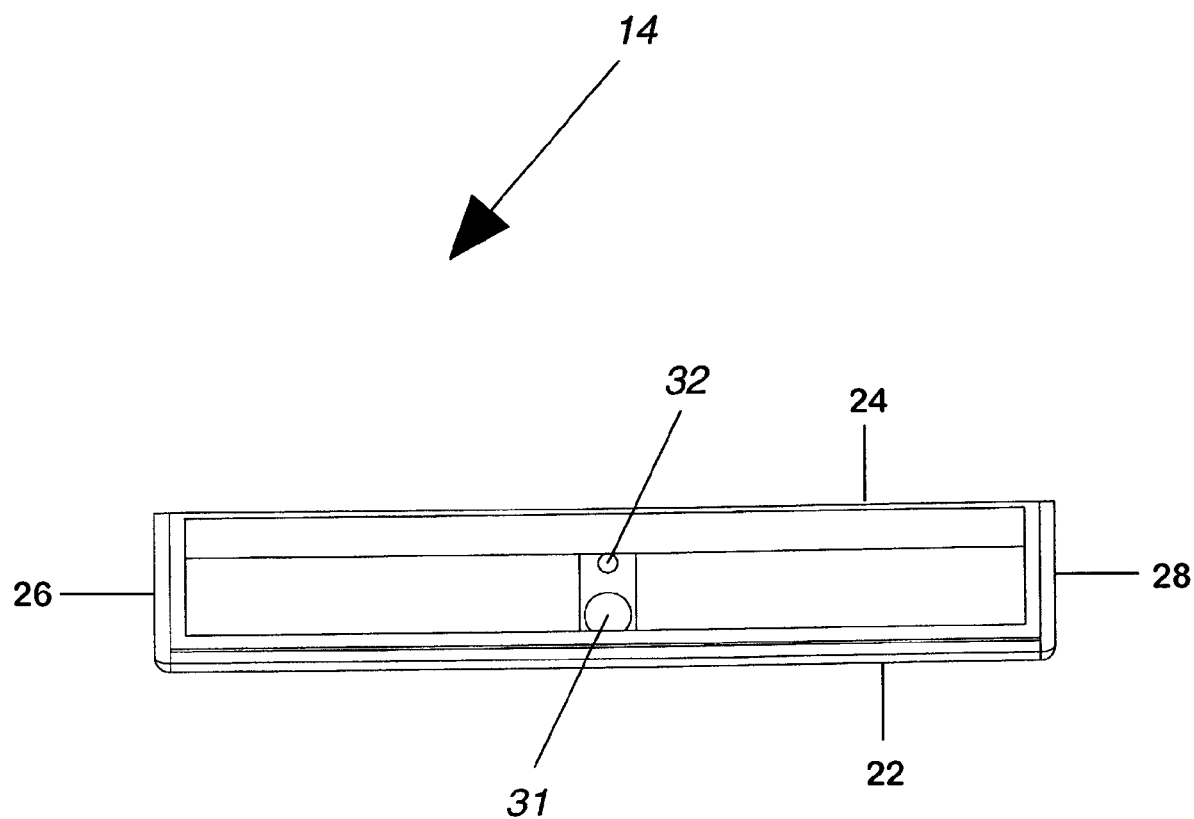
FIG. 8 is a bottom view of the collection funnel.

While the present invention is susceptible of embodiment in various forms, there is shown in the drawings and will hereinafter be described a presently preferred, albeit not limiting, embodiment with the understanding that the present disclosure is to be considered an exemplification of the present invention and is not intended to limit the invention to the specific embodiments illustrated.

Now referring to the figures, set forth is a preferred embodiment of a vehicular windshield washer replenishing system 10 comprising a collection funnel 14 having an angular shaped upper wall 22 and lower wall 24 spaced apart by opposing side walls 26,28. The collection funnel 14 is constructed and arranged for positioning between a windshield and hood of a vehicle.

In a preferred embodiment the collection funnel 14 is positioned on the driver's side of the vehicle but could be positioned in another suitable location. One edge of the mouth will be contoured to fit the arc of the windshield and ensure a water tight seal. This edge will most likely be made of a soft rubber or any suitable material for creating a water tight seal. The positioning of the collection funnel 14 provides gravity feeding of collected liquid to an ion exchange resin chamber 40. In addition to gravity flow, pumps and other types of fluid transport mechanisms can be utilized to transport the fluids from the collection funnel 14 to the ion exchange resin chamber 40.

The collection funnel 14 collects and retains rain water, dew, melting snow, melting ice, and other fluids that come in contact with a vehicle. The collection funnel 14 further includes a mesh screen 30 to filter out large particles at the mouth of the collection funnel 14. The collection funnel has at least one opening in the base 31 constructed and arranged for fluid coupling to the mixing cartridge.

The collection funnel base has a second opening 32 that functions as an initial drain when the funnel first begins to fill. An internal wall positioned perpendicular to the base will create two chambers. The chamber on the discharge side to the mixing cartridge will contain a screen. This configuration will direct approximately the first 40 ml to the second opening drain to dump because the initial water flow will carry most of the large dirt particles. The water will back up, overflow and pass through the screen and discharge to the ion exchange resin chamber 40 of the mixing cartridge 16.

An ion exchange resin chamber 40 is fluidly coupled to the outlet 31 of the collection funnel 14 for conditioning of collected rain water. In a preferred embodiment the transportation of the collected rain water takes place by gravity. In addition to gravity flow, pumps and other types of fluid transport mechanisms can be utilized to transport the fluids from the mixing cartridge to the windshield washer reservoir.

A mixing chamber 50 fluidly coupled to said ion exchange chamber 40 for treating the conditioned rain water, said mixing chamber 50 drawing treatment fluid from an adjacent concentrate chamber, said treated and conditioned rain water directed to the preexisting windshield washer reservoir.

The ion exchange resin chamber 40 preferably includes cation and anion mixed bed resin for reduction of total dissolved solids in the collected rain water. Alternatively, the ion exchange resin chamber may include a sodium based resin for exchange of calcium cations in the collected rain water. The first chamber is in fluid communication with the inlet port. The ion exchange chamber 40 includes a passageway wall 42 to prevent passage of ion exchange resin and provide an unrestricted flow of water there through. The ion exchange chamber 40 may also contain a filter 41 to filter out solid particulates. The mixing chamber 50 is in fluid communication with the outlet port.

The concentrate chamber 60 contains windshield washing fluid concentrate. In a preferred embodiment, the windshield washing fluid is a concentrated liquid, however the windshield washing additive can be in the form of and have the consistencies of, but are not limited to, a gel, a "soap bar" texture, a solid, a "gummy bear" substance or a powder. The various types of water or fluid additives include, but are not limited to, all season windshield cleaner, deicer, all season windshield cleaner and deicer, rain repellant with or without all season cleaner or all season windshield cleaner and deicer.

The mixing chamber 50 includes a wick 52 providing a capillary draw of treating fluid from the concentrate chamber. The wick is constructed and arranged to deliver a predetermined amount of the windshield washing fluid concentrate through capillary action into the mixing chamber 50. The wick can be constructed of any suitable material. In a preferred embodiment, the wick 52 is further defined as a tape style wick comprised of wool, synthetic, cotton, polyester or any other suitable wick material with passageways therein that distribute the windshield washer fluid concentrate by capillary action to the mixing chamber 50. However, metering pumps and other devices can be utilized to deliver the windshield washer fluid concentrate to the mixing chamber 50.

In a preferred embodiment, the concentrate chamber 60 has a conduit channel 54 constructed and arranged to extend into the mixing chamber 50. The wick 52 passes through the conduit channel 54 and extends into the mixing chamber. The windshield washer fluid concentrate formulation is formulated for pass through of the passageways in the wick 52 without clogging or blocking.

The wick is fluidly attached to a pad 56 in the mixing chamber. The pad 56 is constructed and arranged to provide optimal mixing between the windshield washer concentrate and the water. The pad 56 can be comprised of wool, synthetic, cotton, polyester or any suitable wick material know to someone of ordinary skill in the art.

The fluid is transported from the collection reservoir to the ion exchange resin by tubing 73 or other fluid conduits. The fluid coupling between the collection funnel and the ion exchange resin chamber is releasably secured by use of quick connect 70. The conditioned and mixed fluid is transported from the mixing chamber to the existing windshield washer reservoir by tubing 75 or other fluid conduits. The fluid coupling between the mixing chamber and the existing windshield water reservoir is releasably secured by use of quick connect 71.

All of the tubing or fluid conduit are made from plastic materials in a preferred embodiment. However, they can be made from any type of material which can transport fluids without being affected by the fluids.

The ion exchange resin chamber 40, the mixing chamber 50, and the concentrate chamber 60 forms a single replaceable cartridge assembly 16. The cartridge assembly 16 can be reconditioned for reuse and the concentrate can be interchanged with different compositions. The cartridge assembly includes a sight glass 62 in said concentrate chamber.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A vehicular windshield washer fluid replenishing system for conditioning and treating rainwater for use in a preexisting windshield washer reservoir comprising:
   a collection funnel having an angular shaped upper wall and lower wall spaced apart by opposing side walls, said collection funnel constructed and arranged for positioning between a windshield and hood of a vehicle, said collection funnel having an inlet available for receipt of rain water that drains from the windshield for directional passage through said collection funnel to an outlet;
   a housing defined by a top wall, a bottom wall, a pair of side walls, an inlet end wall, an outlet end wall, an intermediate wall extending horizontally between the top and bottom walls, and first and second passageway walls extending orthogonally from the bottom wall to the intermediate wall and from one of the sidewalls to the other sidewalls, wherein the first passageway wall is adjacent the inlet end wall and the second passageway wall is located adjacent the outlet end wall;
   an ion exchange resin chamber containing an ion exchange resin, wherein the ion exchange chamber is bounded by the first and second passageway walls, the intermediate wall, the bottom wall, and the pair of sidewalls;
   an inlet in a portion of the inlet wall adjacent the first passageway wall;
   a fluid conduit coupled to said inlet in said inlet end wall and to said outlet of said collection funnel for conditioning of collected rain water;
   a mixing chamber bounded by the outlet end wall, the second passageway wall, the intermediate wall, the bottom wall, and the pair of sidewalls, wherein said mixing chamber is fluidly coupled to said ion exchange chamber through said second passageway wall and adds a fluid concentrate to the conditioned rain water;
   a concentrate chamber containing said fluid concentrate, wherein the concentrate chamber is bounded by the top wall, the intermediate wall, and the inlet end wall, the outlet end wall, and the pair of sidewalls;
   a wick extending from the concentrate chamber to said mixing chamber for providing a capillary draw of said fluid concentrate from the concentrate chamber to said mixing chamber;
   an outlet in a portion of the outlet end wall adjacent the mixing chamber; and
   a fluid conduit coupled to said outlet in the outlet end wall, wherein said conditioned and treated rain water is directed to the preexisting windshield washer reservoir through said fluid conduit.

2. The vehicular windshield washer fluid replenishing system according to claim 1, wherein said ion exchange resin includes cation and anion mixed resins for reduction of total dissolved solids in the collected rain water.

3. The vehicular windshield washer fluid replenishing system according to claim 1, wherein said ion exchange resin is a cation exchange resin loaded with sodium ions for exchange of calcium ions in the collected rain water for sodium ions loaded on the cation exchange resin.

4. The vehicular windshield washer fluid replenishing system according to claim 1, wherein said first and second passageway walls prevent passage of ion exchange resin and provide an unrestricted flow of water there through.

5. The vehicular windshield washer fluid replenishing system according to claim 1, wherein the fluid conduit is releasably secured to the inlet in said inlet end wall with a quick connect coupling.

6. The vehicular windshield washer fluid replenishing system according to claim 1, wherein the fluid conduit is releasably secured the outlet of said outlet wall with a quick connect coupling.

7. The vehicular windshield washer fluid replenishing system according to claim 1, wherein said housing including said ion exchange resin chamber, said mixing chamber, and said concentrate chamber forms a single replaceable cartridge assembly.

8. The vehicular windshield washer fluid replenishing system according to claim 7, wherein said cartridge assembly can be reconditioned for reuse.

9. The vehicular windshield washer fluid replenishing system according to claim 1 including a sight glass in a portion of one of the sidewalls adjacent said concentrate chamber.

10. The vehicular windshield washer fluid replenishing system according to claim 1, wherein said collection funnel further including a mesh screen to filter out large particles.

\* \* \* \* \*